3,197,493
COPPER ISOCYANIDE COMPLEXES AND
PREPARATION THEREOF
John A. C. Allison, Greenmeadow, Wilmington, Del., assignor to E. I. du Pont de Nemours and Company, Wilmington, Del., a corporation of Delaware
No Drawing. Filed Aug. 17, 1962, Ser. No. 217,529
7 Claims. (Cl. 260—438)

The present invention relates to novel copper isocyanide complexes, to a process for their manufacture and to the generation of organic isocyanides therefrom.

Metal complexes have been of great importance in industry for many years. The Grignard reagents, the aluminum and lithium alkyls, tetraethyl lead, metal carbonyls and many others have been useful in chemical synthesis in the past and in the present as well.

The present invention provides a new class of organometallic compounds having the general structure $$(RNC)_n(CuX)_a$$

where R is an aralkyl group; X is a halo or cyano group; the value of $n$ is 1 through 5; $a$ is 1 or 2; and $n/a$ is 1 through 4. In the special case when $n$ is 4 and $a$ is 1, $x$ is an anion. The halo groups are chloro, bromo and iodo. The compounds are prepared by the reaction of aralkyl halides with CuCN, $K_3Cu(CN)_4$ or $$KAg_2Cu(CN)_4,$$

optionally followed by a disproportionation- or addition-type reaction.

The process leading to these novel copper compounds has as the essential feature the reaction of a simple or complex cupro-cyanide with an alkylating agent, preferably, but not necessarily, in the presence of a diluent. Those products obtained by the direct alkylation are of the types $(RNC)_4CuX$, $(RNC)_5(CuX)_2$, $(RNC)_2CuX$ and $(RNC)(CuX)$. Which of the products is obtained is determined in part by the choice of the cuprocyanide employed. The other subgeneric classes are obtained from these by such reactions as addition and disproportionation. The term, addition reaction, is used to mean the union of two molecules to form a more complex compound, without oxidation or reduction. A disproportionation reaction is one in which like molecules are converted into two or more unlike molecules.

As stated hereinbefore, the starting cupro-cyanide reactant does influence the product obtained. Complexes of the type $(RNC)_4CuX$ are obtained by *direct* alkylation only when $K_3Cu(CN)_4$ is employed as the reactant. The products $(RNC)_5(CuX)_2$ are also isolated in these reactions. The complexes $(RNC)_2CuX$ are always obtained by *direct* alkylation from reaction mixtures wherein $KAg_2Cu(CN)_4$ is employed as reactant. The isocyanide complexes of the type $(RNC)(CuX)$ are obtained by *direct* alkylation only when CuCN is employed as the starting cuprocyanide ingredient. Partially alkylated products, i.e., those in which X is cyano, are obtained from those reaction mixtures in which the cuprocyanide reactant has a multiple number of cyano groups that may be alkylated, usually by stopping the reaction before the alkylation is complete.

The complexes obtained by a direct alkylation procedure are readily converted to other of the isocyanide complexes by disproportionation and addition reactions. For example the complexes $(RNC)_2CuX$ are transformable into $(RNC)_3(CuX)_2$ and $(RNC)_1CuX$ on treatment with methanol; $(RNC)_3CuX$ may be converted to $(RNC)_4CuX$; and $(RNC)_3CuX$ may be obtained by the additive reaction of $(RNC)_4CuX$ and $(RNC)_2CuX$ in chloroform; etc. Obviously, it is not necessary that the starting complex always be isolated for these subsequent reactions. For instance, disproportionations may be conducted during the work-up of alkylation mixtures as is exemplified herein.

The preferred alkylating agents useful in the present invention are methyl bromides having one phenyl substituent. The phenyl ring can be substituted with various groups, for instance halo groups, such as chloro, bromo and iodo; alkyl groups such as methyl, propyl, t.butyl, etc.; aryl groups such as phenyl; etc. Phenyl-substituted methyl chlorides are operative but the yields of complex are somewhat lower, probably because of the lower activity of the benzyl chlorides; the longer reaction times thus required cause increased decomposition of the complexes under the reaction conditions. The presence of electron withdrawing substituents on the phenyl ring also lowers the rate of alkylation and thus lowers the yield of product obtained. Phenyl-substituted methyl iodides may also be used, but inasmuch as their cost is higher than that of the bromides iodides are not preferred.

The process of the invention can be operated without the use of a diluent when the organic halide is liquid at the reaction temperature. Alternatively, and preferably, a diluent is used such as will be described. The nature of the diluent which is suitable depends on the material being alkylated. In general, highly polar diluents are necessary when $K_3Cu(CN)_4$ is alkylated. Acetonitrile is the preferred diluent although dimethylformamide, 1:2 - dimethoxyethane, propionitrile and methylethyl ketone are operative. When silver cuprocyanide $(KAg_2Cu(CN)_4)$ is alkylated, almost any diluent boiling above about 80° C. and not reactive with the alkylating agent is suitable for operation of the process. Chlorobenzene is an especially effective diluent because of its boiling point (~135° C.). Other suitable diluents are toluene, acetonitrile, 2-butanone, 1:2-dimethoxyethane, etc.

The quantity of diluent used is at least enough to give a stirrable slurry. This quantity will ordinarily range from about 2 parts per part of alkylating agent plus cuprocyanide to as much as 100 parts. The preferred range is from about 10 parts to about 25 parts of diluent per part of reactants.

The process can be carried out at from about 30° C. to about 200° C. The range of preferred operating temperature is from about 80° C. to about 140° C. Reaction below 30° C. is so slow as to be impractical. The only limitation of the use of elevated temperatures is that the temperature is below the decomposition temperature of the starting materials and/or products. However, the upper practical temperature limit is about 170° C.

The reaction time is determined by the reaction temperature. Normally the reaction is allowed to proceed until most of the starting material has been converted to the desired product. In some cases it may be desirable to carry the reaction only partly to completion, especially to recover partially alkylated products, i.e., those containing unreacted CN groups. Unused starting materials are recycled to another preparation.

The $(RNC)_n(CuX)_a$ compounds of this invention with the exception of the compounds $(RNC)_4CuBr$, are covalent compounds. The compounds $(RNC)_4CuBr$, however, are salt-like and contain discrete cation and anion structural units which dissociate in polar solvents into $(RNC)_4Cu^+$ and $Br^-$. Hence the bromide anion may be readily exchanged metathetically for anions such as chloride, iodide, triiodide, perchlorate, hydrogen sulfate, thiocyanate, fluoroborate, bromoargentate $(AgBr_2^-)$, ferrocyanide, nitrate, and other anions whose independent existence is likely, such as those assembled in the list of anions in Appendix III of "The Naming and Indexing of Chemical Compounds," by Chemical Abstracts.

The formulae written herein are in some instances simplest formulae, calculated on the basis of analytical data. However, the actual formulae of the compounds may be multiples thereof, such as dimers, trimers, tetramers, etc., of those shown and should be so interpreted.

The new compounds of the present invention are useful for the preparation of isocyanides. Isocyanides are intensely odorous compounds which have been used as additives for gas used in homes and industry for the purpose of detecting and locating leaks.

Isocyanides are prepared from the complexes of the present invention by treating the said complexes with an excess of aqueous cyanide. Quantitative recoveries are obtained when at least four moles of $CN^-$ per gram atom of copper in the complex are employed. The isocyanide may be recovered by extracting the isocyanide with a suitable water-immiscible solvent such as methylene chloride, by distillation, and by other conventional techniques.

When dihalides are employed in the alyklation process, polynuclear isocyanide complexes, containing diisocyanides joined to copper as Cu-CN-R-NC-Cu linkages, are obtained as products. Diisocyanides are generated from these complexes by treatment with aqueous cyanide solution. For example, when p-xylylene dibromide is employed as the alkylating agent, p-xylylenediisocyanide is obtained from the complex. Diisocyanides are useful as cross-linking agents, for instance for polymers containing free OH or NH groups.

One compound of the present invention $$(C_6H_5CH_2NC)_4CuBr$$

gives complete control of tomato early blight when applied to tomato plants in 0.20% concentration.

One of the compounds of the present invention shows a significant change in electrical resistivity with change in temperature as listed below.

| Compound | Volume Resistivity, ohms/cm. | |
|---|---|---|
| | Room Temp. | 70° C. |
| $(C_6H_5CH_2NC)_4(CuBr)_2$ | $8.3 \times 10^{11}$ | $1.2 \times 10^8$ |

This property makes the above compound useful for thermistors.

The invention is more fully described by the following examples. Parts where given are by weight.

Example 1

A mixture of 85 parts of benzyl bromide, 42.3 parts of $KAg_2Cu(CN)_4$ and 330 parts of chlorobenzene is refluxed in a nitrogen atmosphere for 4 hours. The red solution is filtered while hot from the yellow residue. On standing overnight white crystals separate from the filtrate. On drying these crystals amount to 29.5 parts of a compound, $((C_6H_5CH_2NC)_3CuAgBr_2)$, 68.3 parts of which are suspended in 275 parts chlorobenzene, heated to the boiling point, filtered from the AgBr liberated and allowed to cool. Again white crystals separate from the filtrate. After drying these amount to 38.5 parts of a compound $(C_6H_5CH_2NC)_4CuAgBr_2$. This compound (16 parts) is put in 320 parts of methanol, raised to the boiling point, filtered hot from the additional AgBr liberated. The filtrate is evaporated under vacuum. The remaining solid is recrystallized from benzene to give 12 parts of a white solid, melting at 131.5–133° C. This product gives the following by elemental analysis—Calcd. for $C_{32}H_{28}N_4CuBr$: C, 62.79; H, 4.61; N, 9.15; Cu, 10.39; Br, 13.06. Found: C, 62.56; H, 4.77; N, 8.97; Cu, 10.44; Br, 13.43. Thus this compound is $(C_6H_5CH_2NC)_4CuBr$.

The compound $KAg_2Cu(CN)_4$ is prepared by treating a cold solution of 285 parts of $K_3Cu(CN)_4$ in 600 parts of water with 340 parts of silver nitrate in 500 parts of water, dropwise and with vigorous stirring over a two-hour period. The brown precipitate is stirred for 1 hour. The mixture is filtered, and the fine powder is washed successively with water, ethanol and ether, is drained and is dried at 40° C./100 mmm. The product (390 parts) is obtained in 92% conversion.

$(C_6H_5CH_2NC)_4CuBr$ can also be made by suspending 48 parts of benzyl bromide and 11.4 parts $K_3Cu(CN)_4$ in 200 parts of acetonitrile, refluxing the suspension for 20 hours, filtering white hot, evaporating the acetonitrile, diluting the residual oil with 350 parts of petroleum ether, stirring, filtering off the solid and recrystallizing it from benzene. The solid obtained is shown to be $(C_6H_5CH_2NC)_4CuBr$ by a mixed melting point with an authentic sample. $(C_6H_5CH_2NC)_4CuBr$ is converted to $(C_6H_5CH_2NC)_4CuCNS$ by adding a solution of 6.1 parts of it in 50 parts of aqueous methanol to 1.94 parts of KCNS in 50 parts of water. The white precipitate is filtered off, washed with water, methanol and ether and finally dried. It is recrystallized from benzene to give a white solid melting at 140–142° C. Calcd. for $C_{33}H_{28}N_5CuS$: C, 67.16; H, 4.78; N, 11.87; Cu, 10.76; S, 5.43. Found: C, 66.81; H, 4.88; N, 11.81; Cu, 11.12; S, 5.65. $(C_6H_5CH_2NC)_4CuBr$ is converted to $$(C_6H_5CH_2NC)_4CuClO_4$$

by the procedure above substituting 2.77 parts of $KClO_4$ for the KCNS. It melts at 170° C. Similar results are also obtained when $NaBF_4$ or $AgHSO_4$ are substituted for the KCNS with the corresponding anion being formed.

When the $(C_6H_5CH_2NC)_4CuBr$ is treated in methanol with a concentrated solution of iodine in methanol $(C_6H_5CH_2NC)_4CuI_3$ is obtained melting at 94.5° C. and having a golden brown color. If this compound is treated with aqueous $Na_2S_2O_3$ until the color is discharged $(C_6H_5CH_2NC)_4CuI$ is obtained as white crystals melting at 146–147.5° C.

Example 2

$[(C_6H_5CH_2NC)_3CuAgBr_2]$ (6.82 parts) prepared as in Example 1, in 80 parts of methanol is warmed for three minutes at 70° C. The precipitated silver bromide is filtered off and the filtrate evaporated under vacuum to give an oil which slowly solidifies to a waxy solid melting at 93–107° C. This waxy solid is separated into two compounds by dissolving it in 24 parts of acetone and adding, portion-wise, 100 parts of anhydrous ether. The more soluble portion is $(C_6H_5CH_2NC)_3CuBr$, 1.63 parts; the less soluble portion is $(C_6H_5CH_2NC)_4CuBr$, 2.16 parts.

Analysis of the more soluble portion gave the following results—Calcd. for $C_{24}H_{21}N_3CuBr$: C, 58.25; H, 4.28; N, 8.49; Cu, 12.84; Br, 16.15. Found: C, 58.31; H, 4.40; N, 8.21; Cu, 13.22; Br, 16.39. The molecular weight is 498 as compared to the calculated value of 495.

Example 3

A mixture of 60 parts of 2,4-dichlorobenzyl bromide, 21.2 parts of $KAg_2Cu(CN)_4$ and 1000 parts of chlorobenzene is refluxed under nitrogen for 3 days. The brown solution is filtered hot, the residue extracted with 200 ml. of boiling chlorobenzene and the filtrates combined. After cooling a brown solid separates. The product is crystallized from nitromethane to give 17 parts of a light brown solid melting at 199° C. which is

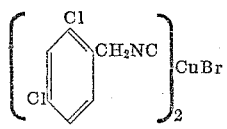

Elemental analyses are—Calcd. for $C_{16}H_{10}N_2CuBrCl_4$: C, 37.28; H, 1.96; N, 5.44; Cu, 12.33; Br, 15.51; Cl, 27.52. Found: C, 37.30; H, 2.06; N, 5.21; Cu, 12.53; Br, 15.31; Cl, 27.80. The molecular weight is 519 as compared to the calculated value of 515.5.

*Example 4*

A mixture of 221 parts of β-bromomethylnaphthalene and 47.5 parts of $K_3Cu(CN)_4$ in 1000 parts of chlorobenzene is refluxed for 30 hours, filtered hot and the residue washed twice with 100 ml. of boiling acetonitrile. The combined filtrates are cooled in ice, a yellow oil separating which slowly crystallizes to a tan powder. After recrystallization from acetonitrile 38.4 parts of colorless flakes are obtained melting at 180–181° C. The product is identified as $(2-C_{10}H_7CH_2NC)_2CuCN$ by elemental analysis. Calcd. for $C_{25}H_{18}N_3Cu$: C, 70.81; H, 4.28; N, 9.91; Cu, 14.99. Found: C, 70.81; H, 4.22; N, 9.73; Cu, 14.80.

*Example 5*

A mixture of 60 parts of 2,4-dichlorobenzyl bromide, 14.25 parts of $K_3Cu(CN)_4$ and 400 parts of acetonitrile is refluxed with agitation for 3 days, filtered hot and the residue washed twice with 100 ml. of boiling acetonitrile. The residue is then extracted with methanol in a Soxhlet flask for three days. The solvent from the extraction is cooled in ice to give 26.7 parts of

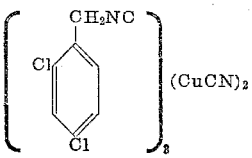

melting at 159–160° C.
Elemental analysis gives the following results—Calcd. for $C_{26}H_{15}N_5Cu_2Cl_6$: C, 42.38; H, 2.05; N, 9.50; Cu, 17.24. Found: C, 42.30; H, 2.16; N, 9.66; Cu, 17.1.

*Example 6*

A mixture of 4.48 parts of CuCN and 16.15 parts of triphenylmethyl bromide are refluxed in 750 parts of carbon tetrachloride for 4 hours under nitrogen. The slurry is then filtered and the filtrate discarded. The residue is extracted four times with 100 parts of hot benzene. By the addition of petroleum ether a solid is precipitated. After drying a light greenish-brown powder having the formula $[(C_6H_5)_3CNC]CuBr$ is obtained melting at 148.5–150° C. with decomposition. Elemental analysis shows the following results—Calcd. for $C_{20}H_{15}NCuBr$: C, 58.20; H, 3.66; N, 3.39; Cu, 15.39; Br, 19.36. Found: C, 58.53; H, 3.84; N, 3.40; Cu, 14.48; Br, 21.96.

Triphenylmethylisonitrile is prepared from this compound by suspending it in methylene chloride and shaking it vigorously with aqueous potassium cyanide containing at least 4 gram molecular weights of KCN per gram atom of copper in the complex. The organic phase is separated and the aqueous phase extracted with methylene chloride. The combined methylene chloride extracts are distilled leaving triphenylmethylisonitrile. Calcd. for $C_{20}H_{15}N$: C, 89.20; H, 5.61; N, 5.20. Found: C, 89.10; H, 5.68; N, 5.03.

This triphenylmethylisonitrile can easily be rearranged to the corresponding nitrile in solvents by adding a catalytic amount of triphenylmethyl bromide.

*Example 7*

To 800 parts of cold methanol is added rapidly with stirring 18.9 parts of $[(C_6H_5CH_2NC)_2CuBr]_2$. A clear solution is formed immediately. On cooling in ice a voluminous precipitate of $(C_6H_5CH_2NC)_3(CuBr)_2$ is obtained (6.08 parts) melting at 73.5–75° C. Calcd. for $C_{24}H_{21}N_3Cu_2Br_2$: C, 45.14; H, 3.32; N, 6.58; Cu, 19.90; Br, 25.03. Found: C, 44.70; H, 3.31; N, 6.50; Cu, 19.71; Br, 24.58.

*Example 8*

A mixture of 60 parts of 2,4-dichlorobenzyl bromide and 14.25 parts of $K_3Cu(CN)_4$ in 400 parts of acetonitrile is refluxed under nitrogen with stirring for 30 hours. The hot suspension is filtered and the residue washed twice with 200 parts of boiling acetonitrile. The combined filtrates are evaporated to dryness and recrystallized from acetonitrile to give colorless plates in 34% conversion melting at 199–200° C. of

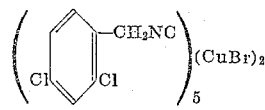

Elemental analysis of the product is as follows—Calcd. for $C_{40}H_{25}N_5CuBr_2Cl_{10}$: C, 39.40; H, 2.07; N, 5.75; Br, 13.15; Cl. 29.10. Found: C, 39.01; H, 2.05; N, 6.06; Br, 13.10; Cl, 28.96.

*Example 9*

To a stirred suspension of 21.15 parts of $KAg_2Cu(CN)_4$ in 160 parts of chlorobenzene is added 26.4 parts of p-xylylenedibromide. The stirred mixture is boiled under reflux for 24 hours and then filtered while hot. This residue is washed with hot chlorobenzene and anhydrous ether, then drained and dried. The dried solid which contains a mixture of polynuclear copper-diisocyanide complexes is then suspended in 150 parts of methylene chloride and shaken with 100 parts of 20% aqueous KCN. The two layers are separated and the aqueous layer extracted with methylene chloride which extract is combined with the organic layer. The methylene chloride is evaporated to give a solid which is extracted with cyclohexane in a Soxhlet extractor. Long colorless needles amounting to 18% conversion of the dibromide starting material to p-xylylenediisocyanide are obtained, melting at 63–64° C. The elemental analysis of these crystals is as follows—Calcd. for p-xylylenediisocyanide: C, 76.84%; H, 5.16%; N, 17.94%. Found: C, 76.79; H, 5.37; N, 17.60.

The above preparation is repeated substituting

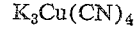

for the $KAg_2Cu(CN)_4$ and acetonitrile for the chlorobenzene with equivalent results.

This diisocyanide is a crosslinking agent for hydroxylic polymers such as cellulose, starch, alginic acid, guar, gum arabic, tragacanth, locust bean gum, polyglucose, polyvinyl alcohol, carrageen, and many others.

*Example 10*

A mixture of 427 parts of $C_6H_5CH_2Br$ and 211.5 parts of $KAg_2Cu(CN)_4$ in 1650 parts of refluxing $C_6H_5Cl$ is stirred vigorously for 24 hours, filtered hot, and the residue is washed twice with 220 parts of boiling chlorobenzene. The combined hot filtrates are treated with 160 parts of methanol and the mixture is allowed to stand overnight. The precipitated silver bromide is then filtered off and the filtrate is evaporated under vacuum to a red syrup. After stirring twice with 1000 parts of boiling petroleum ether to remove excess benzyl bromide, the resulting brown semi-solid is purified by precipitation from acetone with anhydrous ether. The product (136 parts) is a colorless crystalline solid having a melting point of 74.5–75.5° C.

*Analysis.*—Calcd. for ($C_{16}H_{14}N_2CuBr$): C, 50.89; H, 3.74; N, 7.42; Cu, 21.15; Br, 16.82. Found: C, 50.78; H, 3.81; N, 7.50; Cu, 21.46; Br, 16.90. Molecular weight determinations indicate the product to be dimeric. Thus the compound is assigned the formula:

$$[(C_6H_5CH_2NC)_2CuBr]_2$$

Example 11

The second procedure of Example I is followed except that the benzyl bromide is replaced by 37 parts of p-methylbenzyl bromide. The product is recrystallized four times from benzene and obtained as colorless plates, 16.84 parts; the melting point is 138–139° C.

*Analysis.*—Calcd. for $C_{36}H_{36}N_4CuBr$: C, 64.71; H, 5.43; N, 8.39; Cu, 9.51; Br, 11.96. Found: C, 64.54; H, 5.53; N, 8.25; Cu, 9.3; Br, 11.51. Thus, the compound has the formula $$(p\text{-}CH_3C_6H_4CH_2NC)_4CuBr$$

Example 12

The compound of Example 8

$$[2.43 \text{ parts of } (2\!:\!4\text{-}Cl_2C_6H_3CH_2NC)_5(CuBr)_2]$$

is stirred for two days as a suspension in 80 parts of refluxing methanol. The hot mixture is filtered and the residue (2.21 parts) is washed twice with 40 parts of methanol and dried, and then crystallized twice from acetonitrile. The product is a white powder, M.P. 194–195° C.

*Analysis.*—Calcd. for $C_{24}H_{15}N_3CuCl_6Br$: C, 41.09; H, 2.16; N, 5.99. Found: C, 41.39; H, 2.23; N, 6.30. Thus, the compound is assigned the formula $$(2\!:\!4\text{-}Cl_2C_6H_3CH_2NC)_3CuBr$$

Example 13

A mixture of 60 parts of 2:4-dichlorobenzyl bromide and 14.25 parts of $K_3Cu(CN)_4$ in 320 parts of acetonitrile is refluxed under nitrogen with stirring for thirty hours. The hot suspension is filtered and the residue is washed twice with 160 part portions of boiling acetonitrile. The residue is then extracted for two days with acetonitrile in a Soxhlet apparatus and the resulting suspension is evaporated to dryness. After three recrystallizations from acetonitrile, washing with anhydrous ether and drying overnight at 100° C./1 mm., a fluffy, white powder is obtained, M.P. 159–160° C.

*Analysis.*—Calcd. for $C_{17}H_{10}N_3CuCl_4$: C, 44.20; H, 2.7; N, 9.10; Cu, 13.78; Cl, 30.2. Found: C, 43.73; H, 2.50; N, 8.96; Cu, 13.80; Cl, 30.40.

Thus the formula $(2\!:\!4\text{-}Cl_2C_6H_3CH_2NC)_2CuCN$ is assigned to the compound.

Example 14

A mixture of 6.12 parts of $(C_6H_5CH_2NC)_4CuBr$ and 3.78 parts of $[(C_6H_5CH_2NC)_4(CuBr)_2]$ is dissolved in 3000 parts of chloroform. To the very dilute solution anhydrous ether is added slowly. The fluffy white precipitate is collected (1.33 parts), M.P. 87.5–89° C. A mixed melting point with an authentic sample confirmed the identity of the product as $(C_6H_5CH_2NC)_3CuBr$.

Other products obtained by employing the indicated reaction conditions are shown below.

Example 15

| Reactants | | Conditions | Product |
|---|---|---|---|
| KAg₂Cu(CN)₄ | 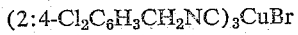 | Refluxing C₆H₅Cl | 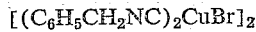 |
| KAg₂Cu(CN)₄ | (C₆H₅)₂CHBr | do | [(C₆H₅)₂CHNC]₂CuBr |
| KAg₂Cu(CN)₄ | 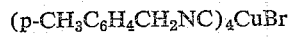 | do | (mCH₃C₆H₄CH₂NC)₂CuBr |
| KAg₂Cu(CN)₄ | 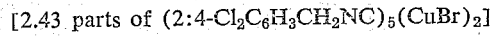 | do | (pCH₃C₆H₄CH₂NC)₂CuBr |
| KAg₂Cu(CN)₄ | C₆H₅CH₂Cl | do | (C₆H₅CH₂NC)₂CuCl |
| K₃Cu(CN)₄ | [2,4,6-trimethylbenzyl bromide] | Refluxing CH₃CN | (2:4-(CH₃)₂C₆H₃CH₂NC)₄Cu·Br |
| K₃Cu(CN)₄ | [3,5-dimethylbenzyl iodide] | do | (3:5-(CH₃)₂C₆H₃CH₂NC)₄CuI |

What is claimed is:

1. A compound having the structure

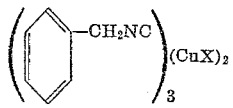

where X is selected from the group consisting of cyano, bromo, chloro and iodo.

2. A compound having the structure

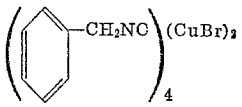

3. A process for the preparation of $(C_6H_5CH_2NC)_3CuX$ comprising contacting a compound having the structure $(C_6H_5CH_2NC)_4CuX$ with a compound having the structure $(C_6H_5CH_2NC)_2CuX$, wherein X is selected from the group consisting of chloro, bromo, cyano and iodo, in chloroform solution.

4. A process for the preparation of a compound having the structure

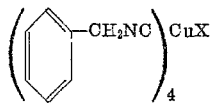

where X is an anion, which comprises heating a benzyl halide with $K_3Cu(CN)_4$ in refluxing acetonitrile.

5. A process for the preparation of a compound having the structure

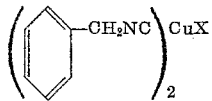

wherein X is selected from the group consisting of cyano, bromo, chloro and iodo, which comprises heating a benzyl halide with $KAg_2Cu(CN)_4$ in refluxing chlorobenzene.

6. A process for the preparation of a compound having the structure

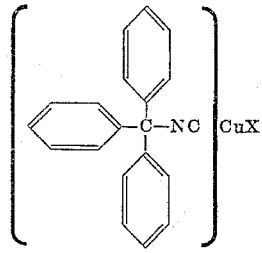

wherein X is a member of the group consisting of chloro, bromo, and iodo, which comprises heating triphenylmethylbromide with CuCN in refluxing carbon tetrachloride.

7. A process for the preparation of a compound having the structure

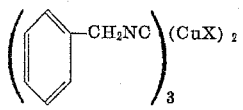

wherein X is selected from the group consisting of cyano, bromo, chloro and iodo, which comprises heating a benzyl halide and $KAg_2Cu(CN)_4$ in refluxing chlorobenzene, and disproportionating the product in methanol solution.

References Cited by the Examiner

UNITED STATES PATENTS 3,062,855   11/62   Heldt _____ 260—439

OTHER REFERENCES

Malatesta, Isocyanide Complexes of Metals, Progress in Inorganic Chemistry, vol. 1, 1959, pp. 291 to 297.

Malatesta, Gazz. Chimica Italiana, vol. 77 (1947), pp. 240–247.

Klages et al., Ber. Deut. Chem., vol. 85 (1952), pp. 109–122.

TOBIAS E. LEVOW, *Primary Examiner.*